United States Patent [19]

Moody

[11] 4,288,501
[45] Sep. 8, 1981

[54] REUSABLE RESERVE BATTERY SYSTEM

[76] Inventor: Warren E. Moody, 95 Fiesta Way, Fort Lauderdale, Fla. 33301

[21] Appl. No.: 119,270

[22] Filed: Feb. 7, 1980

[51] Int. Cl.³ ............................................. H01M 2/40
[52] U.S. Cl. ...................................... 429/70; 429/76; 429/81; 429/89
[58] Field of Search .................... 429/72–85, 429/89, 118, 70, 67

[56] References Cited

U.S. PATENT DOCUMENTS

| | | | |
|---|---|---|---|
| 1,529,585 | 3/1925 | Gameson et al. | 429/72 X |
| 1,781,005 | 11/1930 | Gill | 429/73 |
| 2,584,117 | 2/1952 | Elrod, Jr. | 429/70 X |
| 2,872,500 | 2/1959 | Rowls | 429/76 |
| 3,166,447 | 1/1965 | Bronstert et al. | 429/70 |
| 3,834,944 | 9/1974 | Dennison | 429/118 X |
| 3,912,541 | 10/1975 | Britz | 429/118 |
| 3,928,078 | 12/1975 | Köthe et al. | 429/81 |
| 3,928,080 | 12/1975 | Aronson | 429/81 |
| 4,154,904 | 5/1979 | Michael | 429/76 X |
| 4,221,847 | 9/1980 | Inkmann | 429/82 X |

*Primary Examiner*—Charles F. Lefevour
*Attorney, Agent, or Firm*—Edwin E. Greigg

[57] ABSTRACT

Control valve actuated pneumatic means evacuating electrolyte from a storage battery cell to an adjacent storage compartment and for returning the electrolyte to the cell when desired, having a storage compartment, a battery cell, pipe means extending to a lower part of the cell, control valve means for regulating the evacuation and thereafter return of the electrolyte to the cell as desired.

6 Claims, 2 Drawing Figures

REUSABLE RESERVE BATTERY SYSTEM

CROSS-REFERENCE TO PRIOR ART DISCLOSURES AND REFERENCES

There are no known or anticipatory prior art references.

BRIEF SUMMARY OF THE INVENTION

The invention relates to improved storage battery systems having reusable reserve characteristics, and more particularly the invention relates to those types or material combinations of devices for battery systems that produce higher energy per pound than the well known lead acid battery. For instance the combination of zinc, lead peroxide (positive) and sulphuric acid electrolyte will produce several times the power of an equivalent weight of lead acid batteries and there are many more very desirable combinations.

BACKGROUND OF THE INVENTION

However many of these cell systems suffer from the same problem of "self discharge" whether in use or not due to the interaction between the cell plates and the electrolyte. Of course this defect precludes their use in electric vehicles for which they are otherwise well suited as the batteries may run down while the auto is parked.

Other problems common to storage batteries are the increased internal resistance under heavy current for long periods causing the depletion of the electrolyte and the formation of a high resistance layer of water on the positive plate in a stagnant electrolyte.

OBJECTS AND SUMMARY OF THE INVENTION

Therefore an object of the invention is to provide an apparatus that will deal effectively with both of these problems. The first by removing the electrolyte from the cells, when not in use, to an adjacent storage facility from which it can be quickly returned to the cells when desired. The second by causing the electrolyte level in the cells to periodically lower and raise thus forcing fresh electrolyte from the top of the cell downward through the plates, then reversing the process and sending fresh electrolyte from the bottom of the cell upward through the plates, this process being continuous or intermittent as desired.

BRIEF DESCRIPTION OF THE DRAWINGS

The above and other objects and advantages of the invention will become apparent upon full consideration of the following detailed description and accompanying drawings in which.

DETAILED DESCRIPTION OF THE PREFERRED EMBODIMENT

Figure 2:
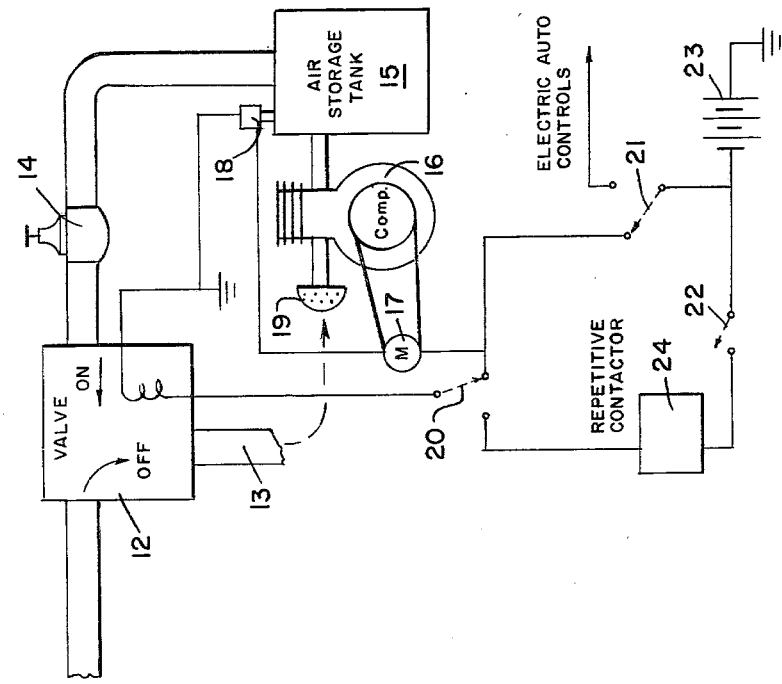
FIGS. 1 and 2 show a schematic diagram of a preferred embodiment of the invention.
Figure 1:
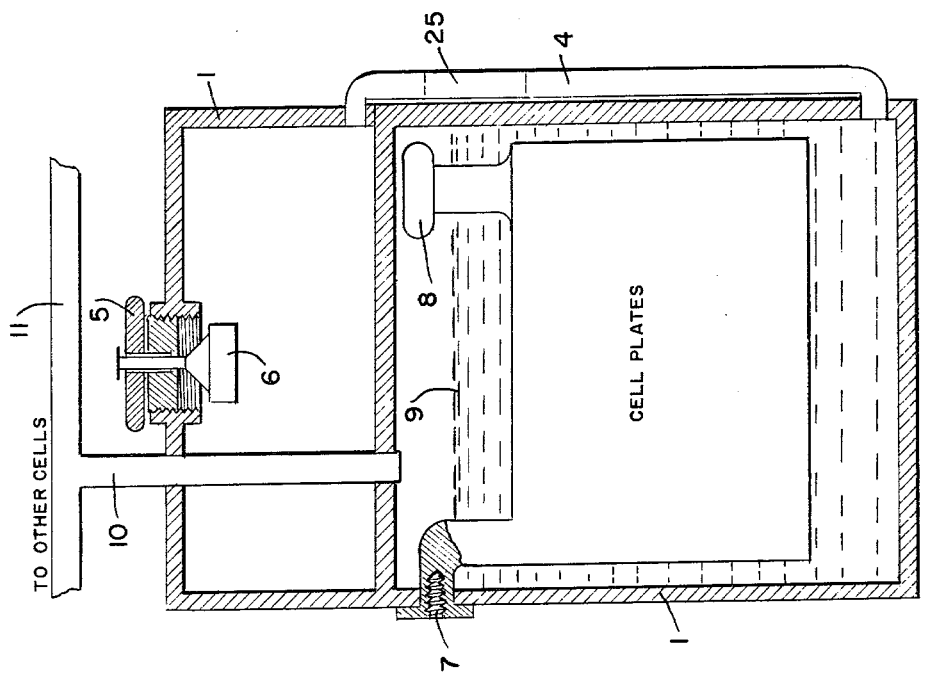

Referring now to the drawings the apparatus includes a small low pressure air storage tank 15, compressor 16 with motor 17, solenoid air valve 12 and an auxiliary battery 23 to power compressor and valve when main battery is deactivated. A multicompartment box 3 of suitable lightweight inert material is mounted on top of each main battery cell 2 with suitable connecting stand pipes 4 to the lower battery cell 2 and each separate compartment will have a filler cap 5 and air vent as shown with said air vent having a suitable float valve 6 arranged to close it when the influx of electrolyte reaches a predetermined height.

A gas and air vent tube 10 connects from the top of each lower cell 2 to all similar tubes 10 from all other cells 2 through pipes 11 and thence to the solenoid valve 12 where it is open to the atmosphere through vent 13 when said solenoid valve is OFF thus releasing cell gas or air pressure.

In operation, to deactivate batteries, air control valve 12 is turned ON manually by switch 21 thus sending low pressure air through pipes 11 and vent tubes 10 into the tops of all cells 2 from the air storage tank 15 which will force electrolyte 9 downward through the plates and up the stand pipes 4 into the upper storage compartment 3. The float valve 6 is open at this time to allow the influx of electrolyte 9 into compartment 3 but will close when the level becomes high enough thus stopping the flow of electrolyte and consequently the influx of air into cells 2. The air compressor, which is intermittently operated by pressure switch 18, and control valve 12 will remain ON during the "deactivation" period so as to maintain sufficient pressure through regulator 14 to keep the electrolyte up in the storage compartments.

When it is desired to "reactivate" the cells the air control valve 12 is turned OFF by switch 21 or 20 and 22 thus releasing air pressure from all cells 2 and allowing the electrolyte to return to cells through stand pipes 4 under gravity flow. A slight drop in electrolyte level in compartment will open vent valve 6 and permit a faster return flow. each cell should have at least one external stand pipe 4 with a clear or transparent window area 25 to determine the proper electrolyte level.

To initiate agitation of the electrolyte by the rising and falling process a suitable repetitive contactor 24 will be placed in the air valve control circuit by switches 20 and 22 while the air compressor remains ON through switch 21. Intermittent short bursts of air pressure produced by operation of air control valve will cyclically lower and raise the electrolyte level in cells 2, the duration and height variation being determined by the programming of contactor 24.

It is obvious that the entire system must be water and air tight to prevent losses and reduce the ON time of air compressor. In the event that deleterious reaction may occur between the cell plates and the air in the cells, when deactivated, the system may be closed upon itself by interconnecting air and gas vent 13 to compressor intake 19 and filling the system with an inert suitable gas.

This system is particularly appropriate for an electric automobile having a large number of batteries, having the batteries widely separated with some in front and some in the rear, as the air can be conveniently piped around the vehicle. A small compressor and a low air pressure may be sufficient as it is not necessary to evacuate the cells rapidly.

A fast reactivation is desirable and to that end a number of stand pipes may be used plus a remote air control valve may be used for the separated batteries for faster venting.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed and desired to be secured by Letters Patent of the United States is:

1. Control valve actuated pneumatic means to evacuate electrolyte from a storage battery cell to an adjacent storage compartment and to return said electrolyte to said cell when desired comprising a storage compartment mounted over and adjacent to a battery cell, said storage compartment being connected to said cell by pipe means extending to a lower part of said cell, said storage compartment having a combination vent and float valve means activating a shut-off valve and a removable filler cap or plug, air pressure supply means piped to said control valve means thence into the top of said battery cell so that when said control valve is turned ON a supply of air under suitable pressure will be introduced into the top section of said cell thus forcing electrolyte downward and through said pipe means into said storage compartment until a level is reached sufficient to close said vent valve and stop further influx of electrolyte into said compartment and influx of air into said cell where maintenance of air pressure will keep electrolyte in said storage compartment until such time as said air control valve is turned OFF permitting said electrolyte to return to said cell under gravity and air pressure with the release of pressure in said cell.

2. The apparatus as claimed in claim 1, wherein the control valve means is an electric solenoid air valve.

3. The apparatus as claimed in claim 1, wherein the accumulator is a battery of a plurality of a number of cells and the adjacent storage tank has said number of compartments each individually communicating with each individual cell through one or more pipes.

4. The apparatus as claimed in claim 1, wherein the storage battery cells and the adjacent storage tank are of air tight construction.

5. The apparatus as claimed in claim 1, wherein the accumulator cells are pulsed with timed bursts of air pressure by a repetitive timer contactor actuating said control valve to cyclically lower and raise the cell electrolyte level at a predetermined rate and a predetermined amount.

6. The apparatus as claimed in claim 1, wherein the pneumatic circuit is closed upon itself to permit the use of a suitable inert gas.

* * * * *